United States Patent
Patel et al.

(10) Patent No.: US 12,530,151 B1
(45) Date of Patent: Jan. 20, 2026

(54) SLICE-LEVEL QUORUM VERIFICATION FOR A DISTRIBUTED STORAGE VOLUME

(71) Applicant: Rakuten Symphony, Inc., Tokyo (JP)

(72) Inventors: Ripulkumar Patel, San Mateo, CA (US); Dhanashankar Venkatesan, San Mateo, CA (US)

(73) Assignee: Rakuten Symphony, Inc., Tokyo (JP)

( * ) Notice: Subject to any disclaimer, the term of this patent is extended or adjusted under 35 U.S.C. 154(b) by 0 days.

(21) Appl. No.: 18/775,829

(22) Filed: Jul. 17, 2024

(51) Int. Cl.
*G06F 3/06* (2006.01)

(52) U.S. Cl.
CPC .......... *G06F 3/0659* (2013.01); *G06F 3/0604* (2013.01); *G06F 3/067* (2013.01)

(58) Field of Classification Search
CPC ....... G06F 3/0659; G06F 3/0604; G06F 3/067
See application file for complete search history.

(56) References Cited

U.S. PATENT DOCUMENTS

| | | | |
|---|---|---|---|
| 2015/0220439 A1* | 8/2015 | Mickens | G06F 3/0619 711/135 |
| 2017/0054802 A1* | 2/2017 | Annamalai | G06F 16/27 |
| 2018/0268044 A1* | 9/2018 | Barber | G06F 16/283 |

* cited by examiner

*Primary Examiner* — Mark A Giardino, Jr.
(74) *Attorney, Agent, or Firm* — David R. Stevens; Stevens Law Group (57) ABSTRACT

A distributed storage system executes write commands with respect to a storage volume mounted to an operating context. The storage volume is composed of a plurality of slices, each of which includes a plurality replicas. If a quorum of replicas are not available to execute a write command referencing a slice, acknowledgment of the write command is suppressed. However, read commands continue to be executed with respect to the slice and other slices of the storage volume. Likewise, write commands for other slices also continue to be executed. A storage manager maintains a state of each replica of each slice and manages restarting or reallocation of replicas that become unavailable.

20 Claims, 5 Drawing Sheets

Fig. 3

SLICE-LEVEL QUORUM VERIFICATION FOR A DISTRIBUTED STORAGE VOLUME

BACKGROUND

Field

This present disclosure relates to slice-level quorum verification for a distributed storage volume.

Background of the Invention

The information disclosed in this background section is only for enhancement of understanding of the general background of the disclosure and should not be taken as an acknowledgement or any form of suggestion that this information forms the prior art already known to a person skilled in the art.

It is often desired, or even required, to store multiple copies of data. The multiple copies are advantageously stored at multiple locations in order to provide further robustness against failure. In such systems, writes of data are completed only when the multiple copies of the data are written.

SUMMARY OF THE INVENTION

In one aspect, a system includes a plurality of computing devices connected to one another by a network and a plurality of storage devices connected to at least a portion of the plurality of storage devices. The plurality of computing devices implement a distributed storage system configured to: receive a first write command from an application, the application executing in an operating context having a storage volume mounted thereto, the storage volume including a plurality of slices and the first write command referencing a first slice of the plurality of slices; forward the first write command for execution with respect to a quorum of replicas of the first slice stored on the plurality of storage devices; determine that the quorum of replicas for the first slice is not available to process the first write command; and in response to determining that the quorum of replicas for the first slice are not available to process the first write command: suppress acknowledging completion of the first write command to the application until the first write command is processed with respect to the quorum of replicas; and continue to process any read commands from the application with respect to the first slice while the quorum of replicas for the first slice is not available.

BRIEF DESCRIPTION OF THE DRAWINGS

Features, aspects, and advantages of embodiments of the disclosure will be described below with reference to the accompanying drawings, in which like reference numerals denote like elements, and wherein.

DETAILED DESCRIPTION

The following detailed description of example embodiments refers to the accompanying drawings. The present disclosure provides illustrations and descriptions, but is not intended to be exhaustive or to limit the implementations to the precise form disclosed. Modifications and variations are possible in light of the present disclosure or may be acquired from practice of the implementations. Further, one or more features or components of one embodiment may be incorporated into or combined with another embodiment (or one or more features of another embodiment). Additionally, the flowchart and description of operations provided below relate to at least one of the embodiments in the present disclosure. It should be noted that it is possible to make other embodiments that do not exactly match the flowchart and its description. It is understood that in other embodiments one or more operations may be omitted, one or more operations may be added, one or more operations may be performed simultaneously (at least in part).

It will be apparent that systems and/or methods, described herein, may be implemented in different forms of hardware, software, or a combination of hardware and software. The actual specialized control hardware or software code used to implement these systems and/or methods should not limit their implementations. Thus, the operation and behavior of the systems and/or methods are described herein without reference to specific software code. It is understood that software and hardware may be designed to implement the systems and/or methods based on the description herein.

Even though particular combinations of features are recited in the claims and/or disclosed in the specification, the particular combinations are not intended to limit the disclosure of implementations. In fact, many of these features may be combined in ways not specifically recited in the claims and/or disclosed in the specification. Even if a dependent claim directly depends on only one claim, the present disclosure may indicate that the dependent claim is dependent on other claims in the claim set.

No element, act, or instruction used herein should be construed as critical or essential unless explicitly described as such. Also, as used herein, the articles "a" and "an" (in other words, nouns not mentioned in the plural) are intended to include one or more items, and may be used interchangeably with "one or more." Also, as used herein, the terms "has," "have," "having," "include," "including," or the like are intended to be open-ended terms. Further, the phrase "based on" is intended to mean "based, at least in part, on" unless explicitly stated otherwise. Furthermore, expressions such as "at least one of [A] and [B]," "[A] and/or [B]," or "at least one of [A] or [B]" are to be understood as including only A, only B, or both A and B.

Figure 1:
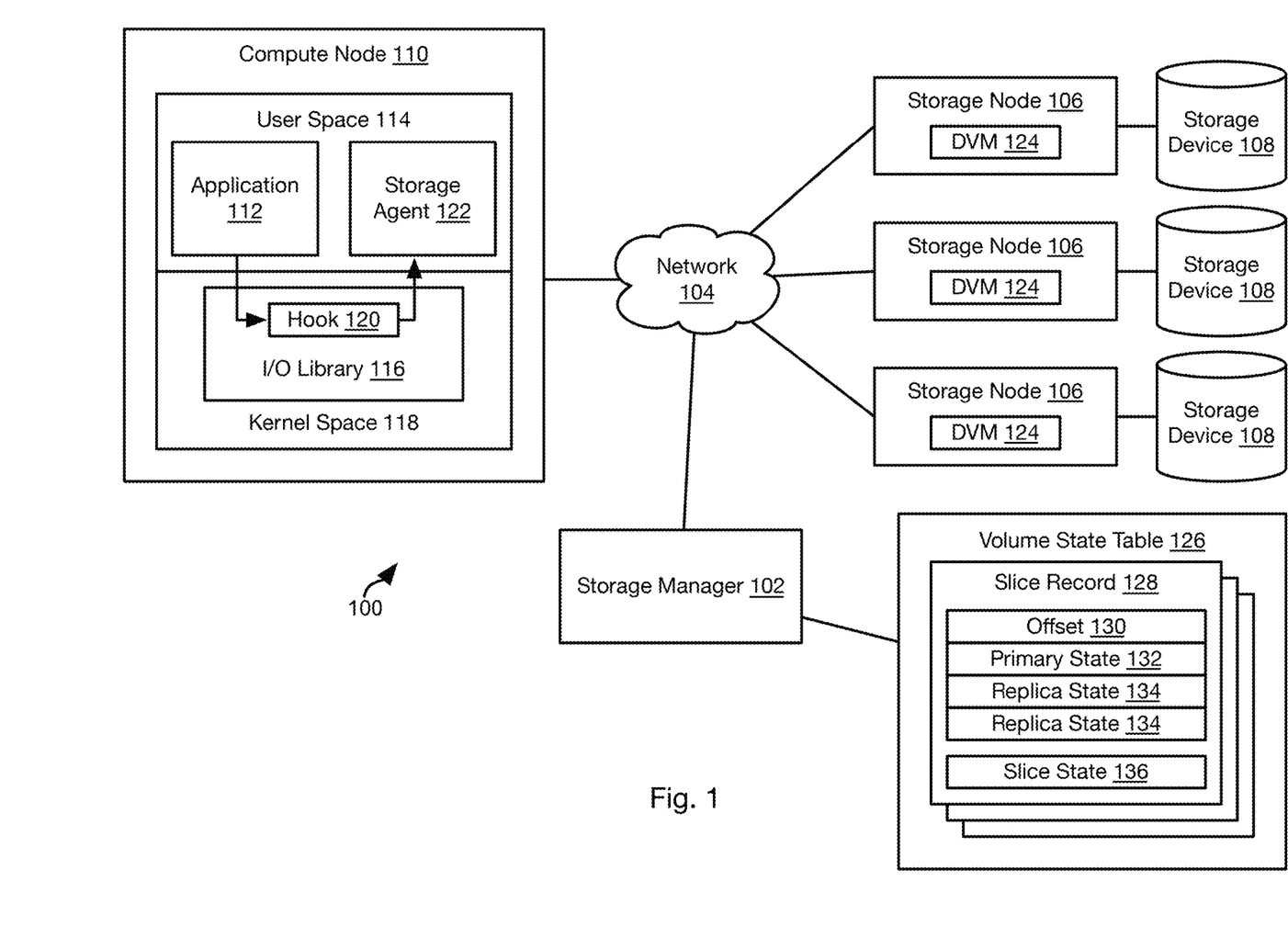
FIG. 1 is a schematic block diagram of a network environment for implementing methods in accordance with an embodiment of the present disclosure.

Referring to FIG. 1, the methods disclosed herein may be performed using the illustrated network environment 100. The network environment 100 includes a storage manager 102 that coordinates the definition and operation of quorums of replicas. In particular, the storage manager 102 may be connected by way of a network 104 to one or more storage nodes 106, each storage node having one or more storage devices 108, e.g. hard disk drives, flash memory, or other persistent or transitory memory. The network 104 may be a local area network (LAN), wide area network (WAN), or any other type of network including wired, fireless, fiber optic, or any other type of network connections.

One or more compute nodes 110 are also coupled to the network 104 and host user applications that generate read and write requests with respect to storage volumes managed by the storage manager 102 and stored within the memory devices 108 of the storage nodes 108.

The methods disclosed herein ascribe certain functions to the storage manager 102, storage nodes 106, and compute node 110. The methods disclosed herein are particularly useful for large scale deployment including large amounts of data distributed over many storage nodes 106 and accessed by many compute nodes 110. However, the methods disclosed herein may also be implemented using a single computer implementing the functions ascribed herein to some or all of the storage manager 102, storage nodes 106, and compute node 110.

The compute node 110 may execute an application 112 performing read and write operations with respect to a storage volume. The application 112 may operate in user space 114 of an operating system, such as an operating system, container, virtual machine, or other operating context executing on the compute node 110. Read and write commands with respect to the storage volume may be performed by invoking functions of an input/output (I/O) library 116 executing in a kernel space 118 of the operating context. Read and write commands may be intercepted by a hook 120 or other executable code embedded in the I/O library 116 and passed to a storage agent 122. The read and write commands may be passed to a storage agent 122, which may execute in the user space 114.

The storage agent 122 cooperates with one or more distributed volume managers (DVM) 124 to execute the read and write commands with respect to the storage devices 108. Each DVM 124 may execute on a storage nodes 106.

The storage volume may be managed by the storage manager 102 using a volume state table 126. The storage volume may be divided into slices, such as slices of 1 gigabyte (GB), 10 GB, or some other size. There may be 64, 128, 256, 1024, or more slices in a storage volume. The volume state table 126 may include a slice record 128 for each slice. The slice record 128 for a slice may record or otherwise be associated with an offset 130 for a slice of the storage volume, e.g., a starting address of the slice within the storage volume. The slice record 128 may further record states of each replica of the slice represented by the slice record 128. For example, the slice record 128 may include a primary state 132 (e.g., a state of a primary replica of the slice) and one or more replica states 134 (e.g., a state of a secondary replica of the slice). For example, a state 132, 134 may have values such as READY, FAULTED, SYNCING, and SYNC_FAULTED. The READY state may indicate that the replica represented by the state 132, 134 is synced with respect to the primary replica and is accessible, i.e., storage node 106 and storage device 108 storing the slice are functional and accessible over the network 104. The FAULTED state may indicate that the that the replica represented by the state 132, 134 is not able to respond to read and write commands due to failure of one or more of failure of the storage node to implement a write command, failure of the storage node 106, failure of the storage device 108, and/or a loss of connectivity to the storage node 106 over the network 104. The SYNCING state may indicate that the that a secondary replica represented by the state 134 is accessible but is not a current copy of the primary replica, e.g., data from the primary replica is being transferred to the secondary replica following restarting of a storage node 106 hosting the secondary replica or reallocation of the secondary replica to a different storage node 106 and/or storage device 108. The SYNC_FAULTED state may indicate that the secondary replica represented by the state 134 is not synced and a syncing process has failed.

A slice record 128 may further store a slice state 136 indicating an overall state of the slice. For example, the slice state 136 may be set to a READY state indicating that the slice is accessible and has a minimum number of replicas that are available and synced with respect to the primary replica. The slice state 136 may be set to a DEGRADED state indicating that less than a minimum number of replicas are available and synced with respect to the primary replica. As used herein "a quorum" refers to a minimum number of replicas that are available and synced with respect to the primary replica. As used herein "quorum not met" maybe be understood as meaning that less than a minimum number of replicas are available and synced with respect to the primary replica.

As used herein "a storage volume" may be understood as a unit of virtual storage that is mounted to an operating context as a single unit and thereby configured to be accessed using input/output commands, such as file system commands referencing the storage volume. The file system commands may invoke functions such as opening a file, writing to a file, reading from a file, and closing a file. Slices of the storage volume are not separately mounted to the operating context. In some embodiments, slices are not referenced by the operating context or application 122. In some embodiments slices are used internally by the storage agent 122, DVM 124, and storage manager 102, such as according to the methods described herein. Read and write commands of the I/O library 116 may be executed with an identifier of the storage volume as an input argument. Applications 112 address read and write commands to the storage volume and an offset within the storage volume (or a file name or other entity that can be resolved to an offset within the storage volume).

As used herein, a "distributed storage system" may refer to a plurality of computing devices connected by a network and implementing the functions ascribed herein to the storage agent 122, storage node 106, storage devices 108, DVMs 124, and storage manager 102.

Figure 2A:
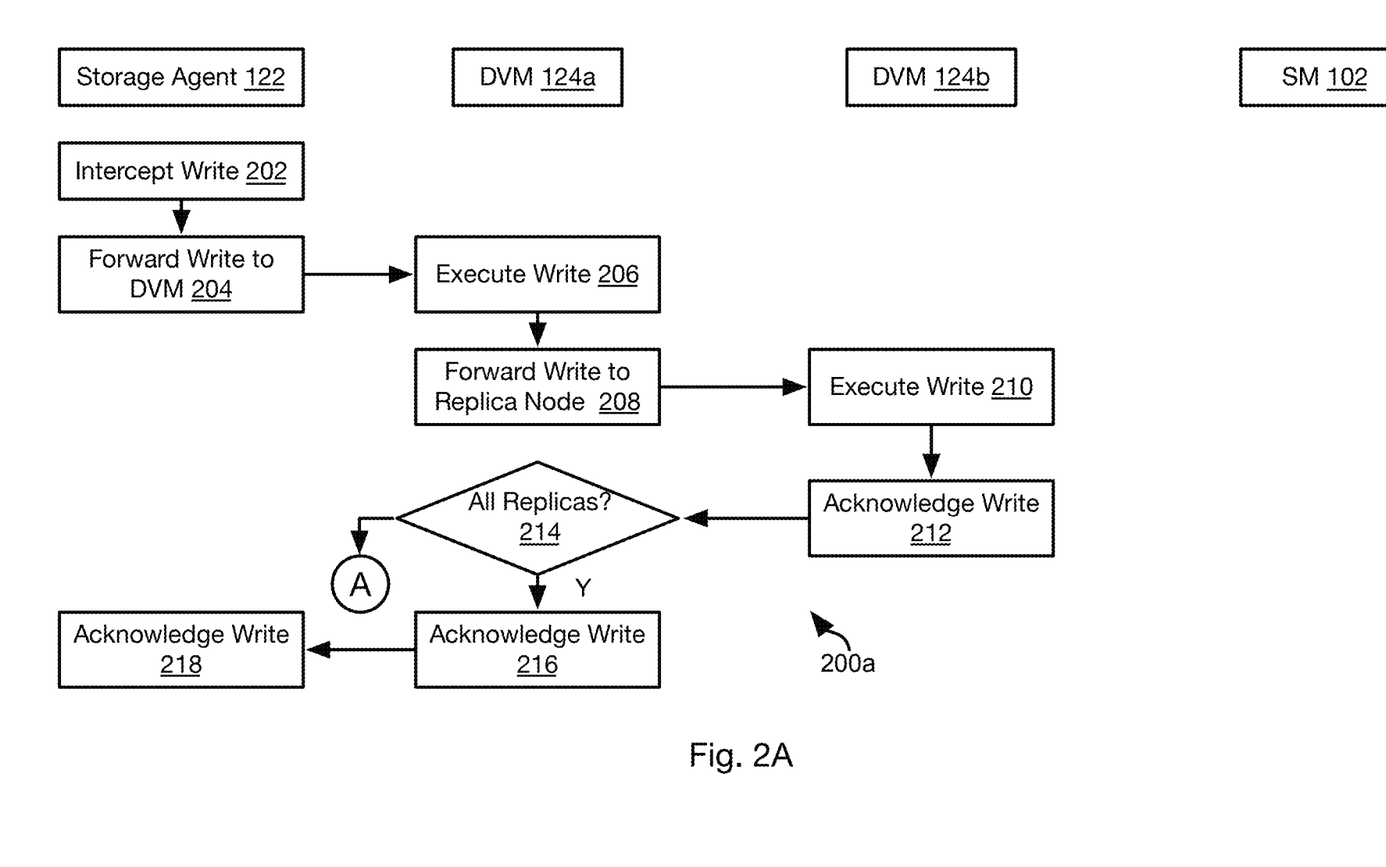
FIG. 2A is a process flow diagram of a method for performing writes with respect to a quorum of replicas in accordance with an embodiment of the present disclosure.

FIG. 2A illustrates a method 200a that may be executed to process a write command received from an application 112 and referencing a storage volume mounted to the operating context of the application 112. The storage volume may be a storage volume as defined above with respect to FIG. 1.

The method 200a includes intercepting 202, by the storage agent 122, the write command, such as receiving the write command from the hook 122. The storage agent 122 may then forward 204 the write command to a DVM 124, such as to a DVM 124a executing on a storage node 106 hosting the primary replica of a slice referenced by the write command. For example, the storage agent 122 may identify the slice (e.g., slice offset) based on an address or range of addresses referenced in the write command. The storage agent 122 may request an address of the storage node 106 hosting the primary replica from the storage manager 102, receive the address of the storage node 106, and forward the write command to the address of the storage node 106.

The DVM 124a may execute 206 the write command, such as by writing data from the write command to a storage device 108 mounted to the storage node 106 executing the DVM 124a. Executing the write command may be performed according to an implementation of the storage volume, such as an append only storage volume or by overwriting data at a storage location of an address within the storage volume referenced by the write command.

The DVM 124a may further forward 208 the write command to one or more other DVMs 124, such as one or more DVMs 124b executing on storage nodes 106 hosting one or more secondary replicas of the slice referenced by the write command. Forwarding 208 may be performed before, after, or concurrently with executing 206 the write command. The DVMs 124b then execute 212 the write command in order to write the data from the write command to the secondary replicas, such as in the manner described above with respect to step 206.

Upon successful execution 210 of the write commands, the one or more DVMs 124b acknowledge 212 completion of the write commands, such as by sending an acknowledgement message referencing the write command to the DVM 124a. The DVM 124a may then evaluate 214 the acknowledgement messages to determine whether the write command was executed with respect to a quorum of replicas, e.g., either (a) all secondary replicas or (b) at least a minimum number of secondary replicas and the primary replica.

If so, the DVM 124a may acknowledge 216 completion of the write command, such as by transmitting an acknowledgment message referencing the write command to the storage agent 122. The storage agent 122 may then acknowledge 218 completion of the write command, such as transmitting acknowledgement of completion of the write command to the application 112 that generated the write command intercepted at step 202. Step 218 may include sending the acknowledgement of completion by way of a hook 120 or other approach. Step 218 may include transmitting the acknowledgement of completion by way of kernel space 118 or directly to the application 112 in user space 114.

Figure 2B:
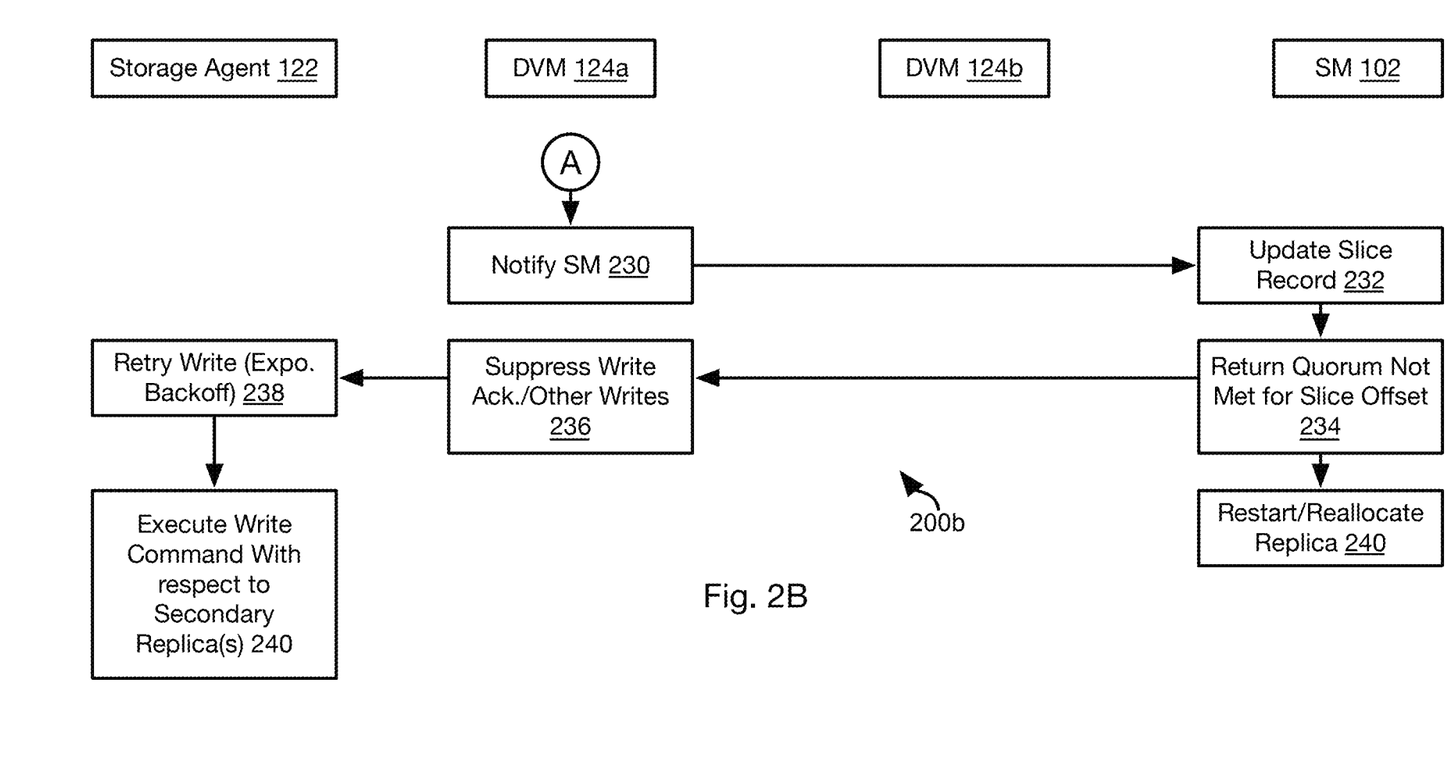
FIG. 2B is a process flow diagram of a method for handling writes where a quorum of replicas is not available in accordance with an embodiment of the present disclosure.

Referring to FIG. 2B, if acknowledgement of completion of the write command by a quorum of replicas is not found to have been received at step 214, then the method 200b of FIG. 2B may be executed.

The DVM 124a may notify 230 the storage manager 102, such as by notifying the storage manager 102 of the number and/or identity of secondary replicas for which acknowledgement of completion of the write command were not received. In response to the notification, the storage manager 102 may update 232 the slice record 128 of the slice referenced by the write command. For example, the replica states 134 of any secondary replicas that did not acknowledge completion of the write command may be updated to FAULTED. Likewise, the slice state 136 may be updated to DEGRADED. If the number of secondary replicas for which acknowledgement of completion of the write command was not received is such that a quorum is not met, then the storage manager may return 234 a "quorum not met" message to the DVM 124a. The "quorum not met" message may include the slice offset of the slice referenced by the write command.

In response to receiving the "quorum not met" message, the DVM 124a suppresses 236 returning acknowledgment of the write command to the storage agent 122. DVM 124a may notify the storage agent 122 that the write command was not completed and/or may allow a timeout period to expire such that the storage agent 122 can determine that the write command has possibly failed. Step 236 may include suppressing processing of additional write commands referencing the slice referenced by the write command from step 202, e.g., processing according to the method 200a. Such write commands may be processed by returning an error message to the source of the write commands or simply failing to respond within a timeout period.

In response to being notified of failure of the write command or expiration of a timeout period, the storage agent 122 may retry 238 the write command, e.g., again send the write command to the DVM 124a. The write commands sent at step 238 may be the same write command forwarded at step 204 with the possible exception of a label, index, or other value indicating that the write command is being resent. Step 238 may include retrying according to an "exponential backoff" such that the amount of time elapsed between a retry and a previous retry increases exponentially with each retry.

Note that step 238 may also be performed by the DVM 124a retrying forwarding the write command to the DVM 124b according to an exponential backoff.

At step 240, the storage manager 102 may attempt to restart a storage node 106 hosting a secondary replica for which acknowledgement of completion of the write command was not received. Step 240 may include reallocating storage in a storage device 108 managed by a different storage node 106 and syncing the reallocated storage with the primary replica. In either case, at some point, the secondary replica may become available again. Accordingly, a retry according to step 238 may succeed such that the write command is executed 240 with respect to the secondary replica that was restarted or reallocated, e.g., by the DVM 124b managing the secondary replica. Once completed, the DVM 124b may acknowledge completion of the write command, such as by sending an acknowledgement message referencing the write command to the DVM 124a. The DVM 124a may then continue with the method 200a starting with step 214. Once acknowledgment of completion of execution of the write command is found 214 to have been received for a quorum of secondary replicas, steps 216 and 218 may be performed.

Figure 2C:
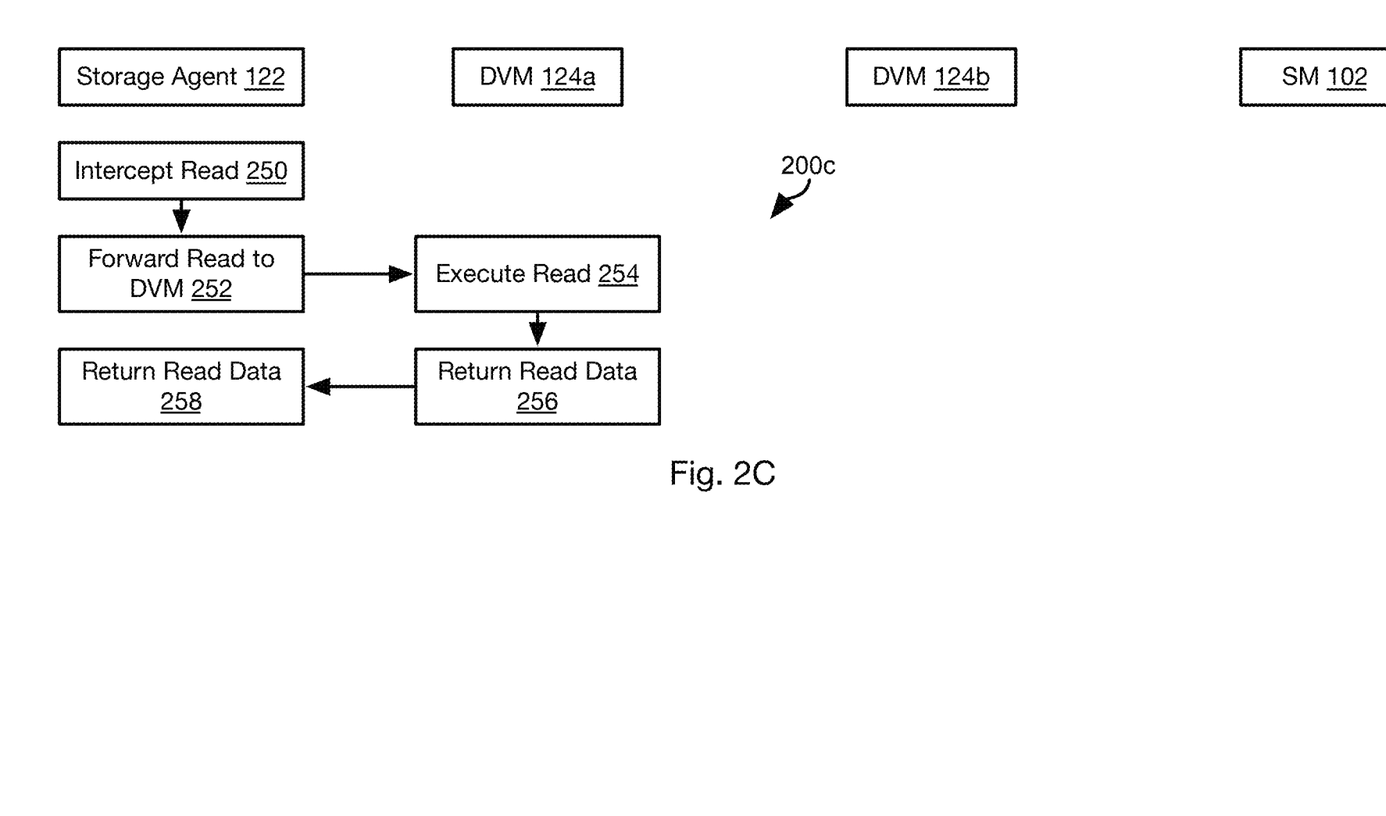
FIG. 2C is a process flow diagram of a method for handling reads with respect to a quorum of replicas in accordance with an embodiment of the present disclosure.

FIG. 2C illustrates a method 200c for processing a read command invoked by an application 112. The method 200b includes intercepting 250, by the storage agent 122, the read command, such as by receiving the read command from the hook 122. The storage agent 122 may then forward 252 the read command to a DVM 124, such as to a DVM 124a executing on a storage node 106 hosting the primary replica of a slice referenced by the write command. For example, the storage agent 122 may identify the slice (e.g., slice offset) based on an address or range of addresses referenced in the read command. The storage agent 122 may request an address of the storage node 106 hosting the primary replica from the storage manager 102, receive the address of the storage node 106, and forward the read command to the address of the storage node 106.

The DVM 124a may execute 254 the read command, such as by reading data referenced by the read command from a storage device 108 mounted to the storage node 106 executing the DVM 124a, e.g., from the primary replica of the slice referenced by the read command. Executing the read command may be performed according to an implementation of the storage volume, such as any approach for reading from an append only storage volume or by reading data from a storage location of an address within the storage volume referenced by the read command. The data read at step 254 is returned 256 to the storage agent 122 which returns 258 the read data to the application 112, such as using a hook 120.

The method 200c may be performed with respect to a slice even if a quorum of replicas is not present for the slice. Likewise the method 200c may be performed for slices of a storage volume even if one or more other slices of the storage volume do not have a quorum of replicas. Note further that writes commands according to the method 200a may be performed for slices of a storage volume even if one or more other slices of the storage volume do not have a quorum of replicas.

Using the approach described herein, a lack of a quorum of replicas for an individual slice of a storage volume may be handled while still allowing reads to be processed with respect to the slice and without impacting the processing of writes for other slices of the storage volume. The availability and robustness of the storage volume is therefore enhanced.

Figure 3:
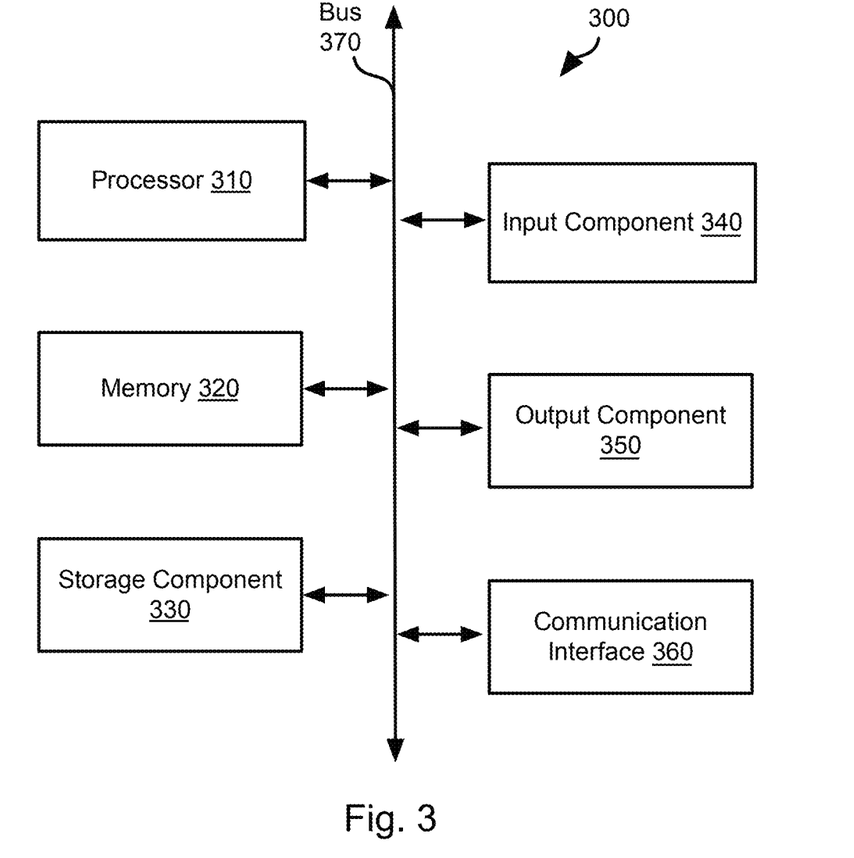
FIG. 3 is a schematic block diagram of an example computing device suitable for implementing methods in accordance with embodiments of the disclosure.

FIG. 3 illustrates an embodiment of a device 300 that may be used to implement the computing devices of the network environment 100. As shown in FIG. 3, the device 300 processor 310, a memory 320, a storage component 330, an input component 340, an output component 350, a communication interface 360, and a bus 370.

The processor 310, as used herein, means any type of computational circuit that may comprise hardware elements and software elements. The processor 310 may be embodied as a multi-core processor, a single core processor, or a combination of one or more multi-core processors and/or one or more single core processors, a distributed processing system, or the like. The processor 310 may be a Central Processing Unit (CPU) a graphics processing unit (GPU), an accelerated processing unit (APU), an application-specific integrated circuit (ASIC), or another type of processing component.

Memory 320 includes a non-transitory computer readable medium. Memory 320 includes a random-access memory (RAM), a read only memory (ROM), and/or another type of dynamic or static storage device (e.g., a flash memory, a magnetic memory, and/or an optical memory) that stores information and/or instructions for use by processor 310. The memory 320 comprises machine-readable instructions which are executable by the processor 310. These machine-readable instructions when executed by the processor 310 cause the processor 310 to perform one or more method steps of an embodiment described above.

Storage component 330 stores information and/or software related to the operation and use of the device 300. For example, storage component 330 may include a hard disk (e.g., a magnetic disk, an optical disk, a magneto-optic disk, and/or a solid-state disk), a compact disc (CD), a digital versatile disc (DVD), a floppy disk, a cartridge, a magnetic tape, and/or another type of non-transitory computer-readable medium, along with a corresponding drive.

Input component 340 is configured to receive information, such as user input. For example, the input component 340 may include, but not be limited to, a touch screen display, a keyboard, a keypad, a mouse, a button, a switch, and/or a microphone. Additionally, or alternatively, the input component 340 may include a sensor for sensing information (e.g., a global positioning system (GPS), an accelerometer, a gyroscope, and/or an actuator).

Output component 350 is configured to provide output information from the device 300. For example, the output component 350 may be, but not limited to, a display, a speaker, instructions to an external device, and/or one or more light-emitting diodes (LEDs).

Communication interface 360 is an interface that provides a communication connection to other devices, such as external devices and internal devices. The connection by the communication interface 360 can be a wired connection, a wireless connection, or a combination of wired and wireless connections, and can be a direct connection or an indirect connection via a communication network that exists between the device 300 and other devices. In other words, the standard of the communication interface 360 is not limited.

The bus 370 acts as an interconnect between the processor 310, the memory 320, the storage component 330, the input component 340, the output component 350, and the communication interface 360 of the device 300. The bus 370 may include a wired interconnection or a wireless interconnection.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300. Further, one or more method steps described in any of the embodiments may be performed utilizing a plurality of devices 300 in communication with one another.

Example Embodiment 1. A system comprising:
 a plurality of computing devices connected to one another by a network; and
 a plurality of storage devices connected to at least a portion of the plurality of storage devices;
 wherein the plurality of computing devices implement a distributed storage system configured to: receive a first write command from an application, the application executing in an operating context having a storage volume mounted thereto, the storage volume including a plurality of slices and the first write command referencing a first slice of the plurality of slices;
 forward the first write command for execution with respect to a quorum of replicas of the first slice stored on the plurality of storage devices;
 determine that the quorum of replicas for the first slice is not available to process the first write command; and
 in response to determining that the quorum of replicas for the first slice are not available to process the first write command:
 suppress acknowledging completion of the first write command to the application until the first write command is processed with respect to the quorum of replicas; and
 continue to process any read commands from the application with respect to the first slice while the quorum of replicas for the first slice is not available.

Example Embodiment 2. The system of Example Embodiment 1, wherein the distributed storage system is configured to determine that the quorum of replicas for the first slice is not available to process the first write command in response to failure to receive acknowledgment of execution of the first write command with respect to all replicas of the quorum of replicas.

Example Embodiment 3. The system of Example Embodiment 1, wherein the distributed storage system is further configured to suppress processing of any additional write commands with respect to the first slice while the quorum of replicas for the first slice is not available.

Example Embodiment 4. The system of claim Example Embodiment 1, wherein the distributed storage system is further configured to, continue to process any write commands from the application with respect to the plurality of slices other than the first slice while the quorum of replicas for the first slice is not available.

Example Embodiment 5. The system of Example Embodiment 1, wherein the operating context is user space of an operating system.

Example Embodiment 6. The system of Example Embodiment 1, wherein the plurality of computing devices comprises a compute node executing the application and a plurality of storage nodes implementing the distributed storage system.

Example Embodiment 7. The system of Example Embodiment 6, wherein the compute node executes an agent of the distributed storage system, the agent configured to retry the first write command.

Example Embodiment 8. The system of Example Embodiment 6, wherein the compute node executes an agent of the distributed storage system, the agent configured to retry the first write command according to an exponential backoff.

Example Embodiment 9. The system of Example Embodiment 1, wherein the plurality of computing devices execute a storage manager configured to maintain a state of the storage volume, the storage manager configured to record availability of each replica of the first slice.

Example Embodiment 10. The system of Example Embodiment 9, wherein the storage manager is configured to restore availability of the quorum of replicas by allocating storage on a storage device of the plurality of storage devices.

Example Embodiment 11. A method comprising:
implementing a distributed storage system including a plurality of computing devices connected to one another by a network;
receiving, by the distributed storage system, a first write command from an application, the application executing in an operating context having a storage volume mounted thereto, the storage volume including a plurality of slices and the first write command referencing a first slice of the plurality of slices;
forwarding, by the distributed storage system, the first write command for execution with respect to a quorum of replicas of the first slice stored on a plurality of storage devices connected to at least a portion the plurality of computing devices;
determining, by the distributed storage system, that the quorum of replicas for the first slice is not available to process the first write command; and
in response to determining that the quorum of replicas for the first slice are not available to process the first write command:
suppressing, by the distributed storage system, acknowledging completion of the first write command to the application until the first write command is processed with respect to the quorum of replicas; and
continuing, by the distributed storage system, to process any read commands from the application with respect to the first slice while the quorum of replicas for the first slice is not available.

Example Embodiment 12. The method of Example Embodiment 11, further comprising determining, by the distributed storage system, that the quorum of replicas for the first slice is not available to process the first write command in response to failure to receive acknowledgment of execution of the first write command with respect to all replicas of the quorum of replicas.

Example Embodiment 13. The method of Example Embodiment 11, further comprising suppressing, by the distributed storage system, processing of any additional write commands with respect to the first slice while the quorum of replicas for the first slice is not available.

Example Embodiment 14. The method of Example Embodiment 11, further comprising continuing, by the distributed storage system, to process any write commands from the application with respect to the plurality of slices other than the first slice while the quorum of replicas for the first slice is not available.

Example Embodiment 15. The method of Example Embodiment 11, wherein the operating context is user space of an operating system.

Example Embodiment 16. The method of Example Embodiment 11, wherein the plurality of computing devices comprises a compute node executing the application and a plurality of storage nodes implementing the distributed storage system.

Example Embodiment 17. The method of Example Embodiment 16, further comprising retrying, by an agent of the distributed storage system executing on the compute node, the first write command.

Example Embodiment 18. The method of Example Embodiment 16, further comprising retrying, by an agent of the distributed storage system executing on the compute node, the first write command according to an exponential backoff.

Example Embodiment 19. The method of Example Embodiment 11, further comprising recording, by a storage manager executed by one or more of the plurality of computing devices, availability of each replica of the first slice.

Example Embodiment 20. A non-transitory computer-readable medium storing executable code that, when executed by one or processing devices, causes the one or more processing devices to implement a method comprising:
implementing a distributed storage system including a plurality of computing devices connected to one another by a network;
receiving, by the distributed storage system, a first write command from an application, the application executing in an operating context having a storage volume mounted thereto, the storage volume including a plurality of slices and the first write command referencing a first slice of the plurality of slices;
forwarding, by the distributed storage system, the first write command for execution with respect to a quorum of replicas of the first slice stored on a plurality of storage devices connected to at least a portion the plurality of computing devices;
determining, by the distributed storage system, that the quorum of replicas for the first slice is not available to process the first write command; and
in response to determining that the quorum of replicas for the first slice are not available to process the first write command:
suppressing, by the distributed storage system, acknowledging completion of the first write command to the application until the first write command is processed with respect to the quorum of replicas; and
continuing, by the distributed storage system, to process any read commands from the application with respect to the first slice while the quorum of replicas for the first slice is not available.

The invention claimed is:

1. A system comprising:
a plurality of computing devices connected to one another by a network; and
a plurality of storage devices connected to at least a portion of the plurality of computing devices;
wherein the plurality of computing devices implement a distributed storage system configured to:
receive a first write command from an application, the application executing in an operating context having a storage volume mounted thereto, the storage volume including a plurality of slices and the first write command referencing a first slice of the plurality of slices;
forward the first write command for execution with respect to a quorum of replicas of the first slice stored on the plurality of storage devices;
determine that the quorum of replicas for the first slice is not available to process the first write command; and
in response to determining that the quorum of replicas for the first slice are not available to process the first write command:
suppress acknowledging completion of the first write command to the application until the first write command is processed with respect to the quorum of replicas; and
continue to process any read commands from the application with respect to the first slice while the quorum of replicas for the first slice is not available.

2. The system of claim 1, wherein the distributed storage system is configured to determine that the quorum of replicas for the first slice is not available to process the first write command in response to failure to receive acknowledgment of execution of the first write command with respect to all replicas of the quorum of replicas.

3. The system of claim 1, wherein the distributed storage system is further configured to suppress processing of any additional write commands with respect to the first slice while the quorum of replicas for the first slice is not available.

4. The system of claim 1, wherein the distributed storage system is further configured to, continue to process any write commands from the application with respect to the plurality of slices other than the first slice while the quorum of replicas for the first slice is not available.

5. The system of claim 1, wherein the operating context is user space of an operating system.

6. The system of claim 1, wherein the plurality of computing devices comprises a compute node executing the application and a plurality of storage nodes implementing the distributed storage system.

7. The system of claim 6, wherein the compute node executes an agent of the distributed storage system, the agent configured to retry the first write command.

8. The system of claim 6, wherein the compute node executes an agent of the distributed storage system, the agent configured to retry the first write command according to an exponential backoff.

9. The system of claim 1, wherein the plurality of computing devices execute a storage manager configured to maintain a state of the storage volume, the storage manager configured to record availability of each replica of the first slice.

10. The system of claim 9, wherein the storage manager is configured to restore availability of the quorum of replicas by allocating storage on a storage device of the plurality of storage devices.

11. A method comprising:
implementing a distributed storage system including a plurality of computing devices connected to one another by a network;
receiving, by the distributed storage system, a first write command from an application, the application executing in an operating context having a storage volume mounted thereto, the storage volume including a plurality of slices and the first write command referencing a first slice of the plurality of slices;
forwarding, by the distributed storage system, the first write command for execution with respect to a quorum of replicas of the first slice stored on a plurality of storage devices connected to at least a portion of the plurality of computing devices;
determining, by the distributed storage system, that the quorum of replicas for the first slice is not available to process the first write command; and
in response to determining that the quorum of replicas for the first slice are not available to process the first write command:
suppressing, by the distributed storage system, acknowledging completion of the first write command to the application until the first write command is processed with respect to the quorum of replicas; and
continuing, by the distributed storage system, to process any read commands from the application with respect to the first slice while the quorum of replicas for the first slice is not available.

12. The method of claim 11, further comprising determining, by the distributed storage system, that the quorum of replicas for the first slice is not available to process the first write command in response to failure to receive acknowledgment of execution of the first write command with respect to all replicas of the quorum of replicas.

13. The method of claim 11, further comprising suppressing, by the distributed storage system, processing of any additional write commands with respect to the first slice while the quorum of replicas for the first slice is not available.

14. The method of claim 11, further comprising continuing, by the distributed storage system, to process any write commands from the application with respect to the plurality of slices other than the first slice while the quorum of replicas for the first slice is not available.

15. The method of claim 11, wherein the operating context is user space of an operating system.

16. The method of claim 11, wherein the plurality of computing devices comprises a compute node executing the application and a plurality of storage nodes implementing the distributed storage system.

17. The method of claim 16, further comprising retrying, by an agent of the distributed storage system executing on the compute node, the first write command.

18. The method of claim 16, further comprising retrying, by an agent of the distributed storage system executing on the compute node, the first write command according to an exponential backoff.

19. The method of claim 11, further comprising recording, by a storage manager executed by one or more of the plurality of computing devices, availability of each replica of the first slice.

20. A non-transitory computer-readable medium storing executable code that, when executed by one or processing devices, causes the one or more processing devices to implement a method comprising:

implementing a distributed storage system including a plurality of computing devices connected to one another by a network;

receiving, by the distributed storage system, a first write command from an application, the application executing in an operating context having a storage volume mounted thereto, the storage volume including a plurality of slices and the first write command referencing a first slice of the plurality of slices;

forwarding, by the distributed storage system, the first write command for execution with respect to a quorum of replicas of the first slice stored on a plurality of storage devices connected to at least a portion of the plurality of computing devices;

determining, by the distributed storage system, that the quorum of replicas for the first slice is not available to process the first write command; and     in response to determining that the quorum of replicas for the first slice are not available to process the first write command:

suppressing, by the distributed storage system, acknowledging completion of the first write command to the application until the first write command is processed with respect to the quorum of replicas; and         continuing, by the distributed storage system, to process any read commands from the application with respect to the first slice while the quorum of replicas for the first slice is not available.

* * * * *